Nov. 14, 1939.   E. BUGATTI   2,180,030
BOLT
Filed Oct. 19, 1936
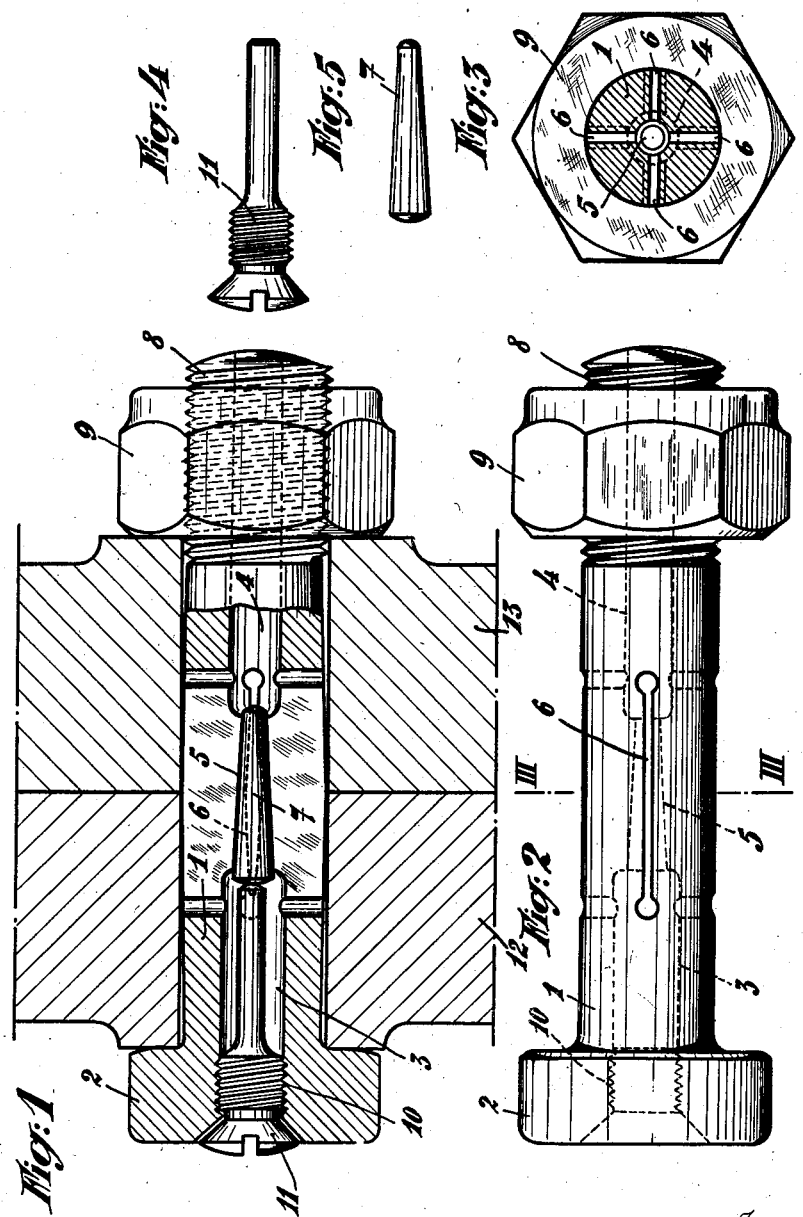
Inventor:
ETTORE BUGATTI.
BY
ATTORNEYS.

Patented Nov. 14, 1939

2,180,030

UNITED STATES PATENT OFFICE 2,180,030

BOLT

Ettore Bugatti, Molsheim, Bas-Rhin, France

Application October 19, 1936, Serial No. 106,438
In France October 26, 1935

2 Claims. (Cl. 85—2)

In various industries such as the construction of machines, the motor industry, the automobile industry, etc., and, in a general manner, in all industries in which bolt and nut articles are utilized for the connection or the fixation of pieces, it is frequently necessary to render this fixation or this connection irreversible. For this purpose, use is generally made of centering feet, conical pins, conical bolts, etc. In some cases, the available room is so restricted that the use of such elements becomes impossible.

The object of the present invention is to provide a bolt permitting to obtain the result above mentioned although the space occupied by said bolt is not greater than that occupied by an ordinary bolt. As it will result from the following description, the word "bolt" employed in the present description for facilitating and simplifying the disclosure of the invention must be taken in its most general meaning and must include, for instance, articles such as ordinary bolts, stays, braces, screws, coach screws, and so on.

The essential feature of the present invention lies in the fact that the bolt is provided with a central hole or cavity including a pointed or tapering portion, for instance of conical, frusto-conical, pyramidal, or similar shape, adapted to cooperate with a wedge, a pin, or a similar member which, when forced into this pointed or tapering part through the hole or channel above referred to, causes the bolt to expand locally and applies it strongly against the inner wall of its housing.

In an embodiment of the invention, the local expansion or deformation of the bolt is facilitated or imposed in predetermined directions owing to the provision of radial or substantially radial slots which may extend from the outer face of the bolt as far as the inner hole thereof. As a rule, these slots are located merely in the useful zone, that is to say that corresponding to the tapering hole containing the expanding element. In order to ensure a better grip of the slotted portion on the inner wall of the bolt housing, this slotted portion of the bolt may be superficially given a rugged surface or provided with small projections such a striæ, small ribs, screw threads, points, etc. It should be noted that the bolt in the state of rest, that is to say in the nonexpanded state, needs not have a diameter exactly equal to that of the hole of the corresponding pieces. This diameter can, without any disadvantage, be slightly smaller. Consequently, there is absolutely no risk, when assembling the parts, of a local deterioration of the surface against which the bolt will subsequently bear when it is expanded. It should be noted that, in the latter state, it exerts a pressure which is distributed substantially evenly over a large area of the walls of the holes made in the pieces.

In order to avoid that, after a certain time, or under the influence of shocks, vibrations, etc., the expanding member may move in its housing in a direction corresponding to a reduction of the tightening action, I may add suitable locking means. This locking device may consist of a screw or a rod screw threaded over a part or the whole of its length, which is screwed into a correspondingly screw-threaded portion of the central hole of the bolt. If desired, the screw may be reduced to a mere threaded plug which acts upon the expanding member through intermediate members. If desired, the locking device may consist of a transverse pin which engages through the head of the bolt and which keeps the expanding member in position by direct contact with its end or by contact with an intermediate element.

When this is pososible, the central hole extends through the bolt from one end thereof to the other, so as to permit of driving out the expanding member by acting on its pointed end, when it is desired to separate the parts. If such an arrangement cannot be employed, it is however possible to arrange the expanding member in such manner as to facilitate its removal by means of a tool, for instance a hook, a key, or a sleeve provided with inner threads and which would be screwed upon the end of the expanding member.

Other features of the present invention will result from the following detailed description of some specific embodiments thereof.

A preferred embodiment of the present invention will be hereinafter described, with reference to the accompanying drawing, given merely by way of example, and in which:

Fig. 1 shows, in partial axial section, a bolt according to the present invention, in the working position;

Fig. 2 is an elevational view of the bolt alone;

Fig. 3 is a sectional view on the line III—III of Fig. 2;

Fig. 4 is a separate view of the device for locking the expanding member;

Fig. 5 is a separate view of the expanding member itself.

The bolt includes a shank designated as a whole by reference character 1 and a head 2. In the example shown by the drawing, the bolt is provided with a central hole consisting of two end recesses 3 and 4, of substantially cylindrical shape and an intermediate housing 5 of substantially frusto-conical shape. Around this housing, the rod is provided with slots 6 (in the example illustrated by the drawing, there are four of these slots) extending in a substantially radial direction. The housing 5 is adapted to receive an expanding member 7 consisting of a frusto-conical pin (Fig. 5). Shank 1 is screw threaded at 8 so as to permit of screwing nut 9 on the bolt and it is provided with inner threads at 10. A screw 11, a portion only of which is screw threaded and which includes a rod acting as a push piece, can be screwed in threaded portion 10 so as to fix pin 7 in position.

In order to assemble two elements 12 and 13 together by means of the bolt, nut 9 is tightly screwed on said bolt, after which pin 7 is inserted into its housing 5 through recess 3 and it is forcefully driven into this housing by means of any suitable tool. This causes the portions of the bolt shank extending between slots 6 to expand as shown in a purposely exaggerated manner by Fig. 1, thus ensuring a perfect contact of the bolt shank with the inner faces of the housings of the bolt in elements 12 and 13, and also a very satisfactory centering of the bolt.

It is easy to arrange that the tightening thus obtained may act at any suitable place, for instance on a single of the elements above mentioned, on several of these elements, or on all of them, when their number is higher than two. Superficial roughness may obviously be provided on shank 1 in the part thereof surrounding slots 6 in order to improve the engagement of the parts.

Once pin 7 has been inserted into position, it is locked in this position by means of screw 11.

In order to remove the bolt, it suffices to drive pin 7 in the opposite direction by means of a tool inserted through recess 4.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. The combination of two rigid members juxtaposed along a contact surface; a bolt having a shank passing through said members substantially at right angles to the contact surface, and a head engaged with one of said members, the shank having a longitudinal bore and being split for expansion purposes in a zone extending through said contact surface on either side thereof; a nut operatively engaging said shank and the other member, at a point remote from the bolt head for tensioning to bolt shank between the members; an expander in the bore, located in said zone, operative to expand the shank and hold it into gripping contact with both members in the vicinity of said contact surface; and means for locking the expander in operative position with respect to the bolt.

2. An assembled structure which comprises a pair of members arranged in contacting relation in a plane of assembly and having aligned bores running transversely therethrough; a deflectible bridge in the bores, passing through the plane of assembly and anchored at spaced apart points on either side of said plane to respective members, the bridge being placed under permanent tension; and means located within the bores for deflecting the bridge in a zone passing through the plane of assembly, to press the bridge in said zone in tight contact with the members, thereby superimposing a further tension upon the permanent tension and further stressing the members.

ETTORE BUGATTI.